United States Patent
Toy et al.

(10) Patent No.: US 8,725,124 B2
(45) Date of Patent: May 13, 2014

(54) ENHANCED DEPLOYMENT OF APPLICATIONS

(75) Inventors: Andrew Jong Kein Toy, New York, NY (US); Alexander Allan Trewby, London (GB); David Wei Zhu, Palo Alto, CA (US)

(73) Assignee: Enterproid HK Ltd, Tsimshatsu, Kowloon (HK)

(*) Notice: Subject to any disclaimer, the term of this patent is extended or adjusted under 35 U.S.C. 154(b) by 56 days.

(21) Appl. No.: 13/412,263

(22) Filed: Mar. 5, 2012

(65) Prior Publication Data

US 2013/0231093 A1 Sep. 5, 2013

(51) Int. Cl.
*H04M 3/42* (2006.01)

(52) U.S. Cl.
USPC ... 455/414.1; 705/26.5; 705/27.1; 705/26.61; 705/27.2

(58) Field of Classification Search
USPC .......... 455/414.1; 705/26.5, 27.1, 26.61, 27.2
See application file for complete search history.

(56) References Cited

U.S. PATENT DOCUMENTS

| 7,836,439 | B2 | 11/2010 | Shenfield |
| 7,926,087 | B1 | 4/2011 | Holl et al. |
| 2003/0091166 | A1 | 5/2003 | Hershenson |
| 2004/0025165 | A1 | 2/2004 | Desoli et al. |
| 2005/0066303 | A1 | 3/2005 | Rochette et al. |
| 2005/0104717 | A1 | 5/2005 | Kaplan |
| 2005/0240758 | A1 | 10/2005 | Lord et al. |
| 2006/0116110 | A1 | 6/2006 | Chen et al. |
| 2006/0250578 | A1 | 11/2006 | Pohl et al. |
| 2006/0258337 | A1 | 11/2006 | Fujita et al. |
| 2006/0259491 | A1 | 11/2006 | Hooper et al. |
| 2007/0072564 | A1 | 3/2007 | Adams |
| 2007/0130476 | A1 | 6/2007 | Mohanty |
| 2007/0259657 | A1 | 11/2007 | Cheng |
| 2008/0081662 | A1 | 4/2008 | Strandell et al. |
| 2008/0113677 | A1 | 5/2008 | Madnawat |
| 2008/0153521 | A1 | 6/2008 | Benaouda et al. |
| 2008/0242282 | A1 | 10/2008 | Kuhl et al. |
| 2008/0248834 | A1 | 10/2008 | Chatterjee |
| 2008/0301718 | A1 | 12/2008 | Backlund et al. |
| 2009/0036111 | A1 | 2/2009 | Danford et al. |
| 2009/0138820 | A1 | 5/2009 | Lockhart et al. |
| 2009/0265748 | A1 | 10/2009 | Dotchevski et al. |
| 2009/0320088 | A1 | 12/2009 | Gill et al. |
| 2010/0067631 | A1 | 3/2010 | Ton et al. |

(Continued)

FOREIGN PATENT DOCUMENTS

WO 20080148222 12/2008

OTHER PUBLICATIONS

OA dated Nov. 13, 2012 for U.S. Appl. No. 12/974,478, 28 pages.

(Continued)

*Primary Examiner* — Khalid Shaheed
(74) *Attorney, Agent, or Firm* — Amin, Turocy & Watson, LLP

(57) ABSTRACT

Systems and methods for managing distribution of applications are provided herein. A host server can act as an intermediary between a communications device and an app store in order to manage distribution of applications to the communications device. Thus, the host server can receive from the communications device an app request for an application that resides at the app store. The host server can examine various catalog information and provide a package that includes the application to the communications device.

26 Claims, 11 Drawing Sheets

(56) References Cited

U.S. PATENT DOCUMENTS

| | | | |
|---|---|---|---|
| 2010/0088367 | A1 | 4/2010 | Brown et al. |
| 2010/0099396 | A1 | 4/2010 | Huq et al. |
| 2010/0107215 | A1 | 4/2010 | Bechtel et al. |
| 2010/0210240 | A1 | 8/2010 | Mahaffey et al. |
| 2010/0241966 | A1 | 9/2010 | Kim et al. |
| 2010/0292996 | A1 | 11/2010 | Margrett et al. |
| 2011/0010699 | A1 | 1/2011 | Cooper et al. |
| 2011/0061008 | A1 | 3/2011 | Gupta et al. |
| 2011/0066664 | A1 | 3/2011 | Goldman et al. |
| 2011/0082900 | A1 | 4/2011 | Nagpal et al. |
| 2011/0145920 | A1 | 6/2011 | Mahaffey et al. |
| 2011/0161912 | A1 | 6/2011 | Eteminan et al. |
| 2011/0289003 | A1 | 11/2011 | Womack et al. |
| 2012/0046069 | A1 | 2/2012 | Cupala et al. |
| 2012/0064880 | A1 | 3/2012 | Miller et al. |
| 2012/0116937 | A1 | 5/2012 | Van et al. |
| 2012/0157038 | A1 | 6/2012 | Menezes et al. |
| 2012/0180073 | A1* | 7/2012 | Hung ............................ 719/313 |
| 2012/0303476 | A1* | 11/2012 | Krzyzanowski et al. .... 705/26.5 |

OTHER PUBLICATIONS

International Search Report and Written Opinion dated Apr. 19, 2013 for International Application No. PCT/US13/24442, 11 pages.
International Search Report and Written Opinion dated Apr. 11, 2013 for International Application No. PCT/US13/24437, 11 pages.
OA dated Feb. 1, 2013 for U.S. Appl. No. 12/825,902, 41 pages.
International Search Report dated Jun. 28, 2011 for PCT Patent Application No. US11/33816, 13 pages.
International Search Report and Written Opinion dated Jun. 30, 2011 for International Application No. PCT/US11/33817, 18 pages.
Office Action dated Jul. 17, 2013 for U.S. Appl. No. 12/974,478, 19 pages.
Office Action dated Jun. 14, 2013 for U.S. Appl. No. 12/825,902, 28 pages.
Office Action dated Jun. 25, 2013 for U.S. Appl. No. 13/432,684, 33 pages.
Final Office Action dated Oct. 10, 2013 for U.S. Appl. No. 13/432,684, 31 pages.
International Search Report and Written Opinion dated Sep. 27, 2013 for International Application No. PCT/US13/38478, 60 pages.
Advisory Action dated Jan. 7, 2014 for U.S. Appl. No. 13/432,684, 22 pages.
EP Search Report dated Dec. 5, 2013 for Application Serial No. PCT/US2011/033816, 6 Pages.
Office Action dated Feb. 25, 2014 for U.S. Appl. No. 12/825,902, 41 pgs.

* cited by examiner

ENHANCED DEPLOYMENT OF APPLICATIONS

CROSS-REFERENCE TO RELATED APPLICATIONS

This application is related to U.S. patent application Ser. No. 12/825,902, filed Jun. 29, 2010 and entitled REMOTE ACCESS TO A MOBILE DEVICE. This application is also related to U.S. patent application Ser. No. 12/974,478 filed Dec. 21, 2010 and entitled CONTEXTUAL ROLE AWARENESS. This application is also related to Ser. No. 13/432,684 filed on Mar. 28, 2012 and entitled CUSTOM APPLICATION CONTAINER FOR MOBILE OPERATING SYSTEMS AND/OR DEVICES. The entireties of these applications are incorporated herein by reference.

TECHNICAL FIELD

This disclosure generally relates to enhancing deployment of applications and more specifically to enhancing application deployment from an app store to a communications device.

BACKGROUND

App stores have evolved into the primary means for distribution of applications to communication devices such as smart phones. In some cases, certain phones require that applications be delivered by way of an app store. Unfortunately, app stores have a number of limitations that can negatively impact the design of applications, the business models of applications developers, and the experiences of the end-user.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its purpose is to present some concepts of the specification in a simplified form as a prelude to the more detailed description that is presented in this disclosure.

Systems and methods disclosed herein relate to managing distribution of applications. A host server can be employed as an intermediary between a communications device and one or more app stores in order to manage the distribution of applications. The host server can be coupled to a communications network and can include a receiving component that can receive an app request from a communications device. The app request can request an application that resides at an app store. The host server can also include a catalog component that can examine a catalog maintained by the host server. The catalog can include device information associated with the communications device and app information associated with the application. The catalog component can determine a package for the communications device that includes the application in response to examination of the catalog. The host server can include an assembly component that constructs the package and a communications component that receives the application from the app store and transmits the package to the communications device.

The following description and the drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

BRIEF DESCRIPTION OF THE DRAWINGS

Numerous aspects, embodiments, objects and advantages of the present invention will be apparent upon consideration of the following detailed description, taken in conjunction with the accompanying drawings, in which like reference characters refer to like parts throughout, and in which.

DETAILED DESCRIPTION

Overview

Figure 1:
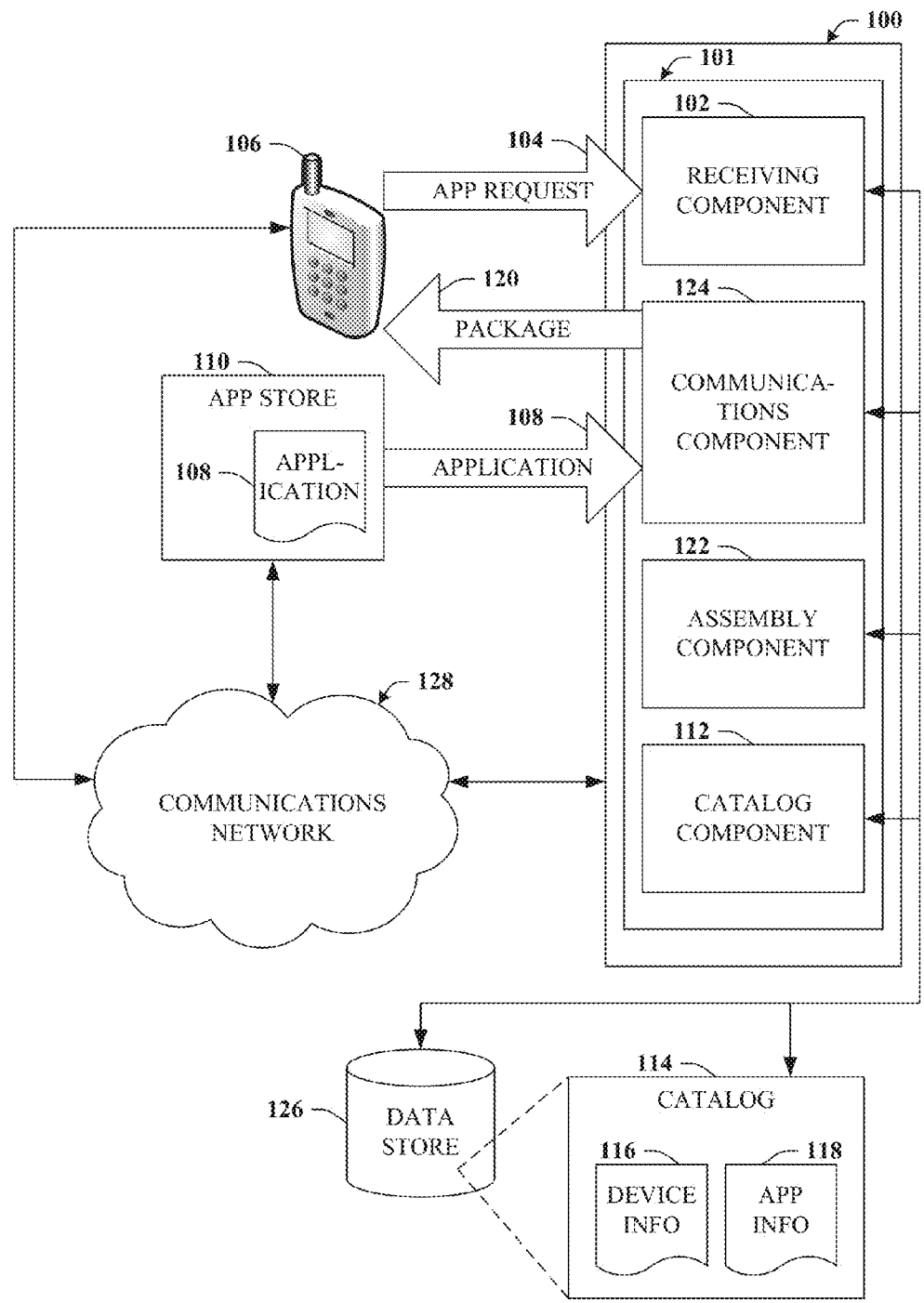
FIG. 1 illustrates a high-level functional block diagram of an example system that manages distribution of applications.

Various aspects or features of this disclosure are described with reference to the drawings, wherein like reference numerals are used to refer to like elements throughout. In this specification, numerous specific details are set forth in order to provide a thorough understanding of this disclosure. It should be understood, however, that certain aspects of disclosure may be practiced without these specific details, or with other methods, components, materials, etc. In other instances, well-known structures and devices are shown in block diagram form to facilitate describing the subject disclosure.

Systems and methods disclosed herein relate to managing distribution of applications. For modern communications devices, particularly mobile devices, distribution of applications is provided by app stores. However, while app stores can effectively manage licensing and purchasing of applications, app stores are deficient in many other areas. For example, app stores treat all applications as standalone entities without the ability to identify relationships between those applications. As a result, developers of entities that have a particular relationship often cannot leverage the relationship if their products are to be distributed by way of an app store.

As a non-limiting example of relationship between different applications, consider the case in which two applications both employ a common library. Since the developer(s) of these applications cannot be assured that the library will exist on the device, particularly in the case of app store distribution, that library will commonly be statically included in the application code or a copy of the library will be installed along with the application. As a result, both applications will include redundant information and will be larger in size than need be. In fact, it is a common scenario that applications are about 50% to 75% larger in size than is necessary for precisely this reason. Moreover, if the library that is utilized by both applications is later patched, then both applications will need to be updated in order to realize the effects of the patched library.

Modular design techniques can be very efficient for applications, yet since app stores do not provide a means to maintain relationships between applications, the distribution of applications has forced the designers of applications to forego the efficiencies that might otherwise be available to them.

Furthermore, this shortcoming associated with app stores also diminishes the business model opportunities available to applications developers. For example, developers that offer many applications, possibly as part of a suite are faced with a combinatory complexity issue that is unnecessary. The developer might like to offer various combinations of 10 different applications in a suite, ranging from individual applications purchased singly to the entire suite. However, in order to do this with app stores, each different combination must be offered as a separate download, potentially resulting in confusion and difficulty that is further compounded when updates or patches are released.

To remedy these and other shortcomings associated with app store-based distribution of applications, the disclosed subject matter can provide an intermediary between the app store and the communications device that requests applications. The intermediary can be a server that is distinct from existing app stores to which it can interface on behalf of the communications device, but can also provide an internal app store of its own. The server can manage and/or maintain a catalog that describes the relationships between applications (and other relevant information). For example, the catalog can include various information relating to the communications device (e.g., device information) and various information relating to the application (e.g., app information) sought to be downloaded from an app store.

Accordingly, the host server can identify (e.g., based upon device information) what applications, libraries, or other entities already exist on the communications device, what are the relationships/dependencies of those extant applications, their versions, licensing, entitlements, and so on. Additionally, the host server can identify (e.g., based upon app information) the relationships, dependencies, licensing/entitlement opportunities associated with the application sought to be downloaded, the location(s) of that application or the location(s) of related applications, the version identifiers of those applications, and so forth.

By examining such information, the server can determine a package for the communications device that can enable a suitable download from app stores that do not provide such features. In this manner, the shortcomings of app stores can be overcome.

Managing Distribution of Applications

Referring now to FIG. 1, system 100 that manages distribution of applications is depicted. System 100 can include host server 101 operatively coupled to a communications network (e.g., communications network 128). Host server 101 can include memory that stores computer executable components and a processor that executes computer executable components stored in the memory, an example of which can be found with reference to FIG. 10. In addition, system 100 can include receiving component 102 that can be configured to receive app request 104 from communications device 106 that requests application 108 that resides at app store 110. In one or more embodiments, communications device 106 can be a mobile device that utilizes a mobile operating system, such as, e.g., a smart phone, a tablet, a reader, etc. Likewise, in one or more embodiments, app store 110 can include an application distribution server configured to deploy applications to communications device 106. Typically, app store 110 will support storage and access to various applications stored therein, and will generally support licensing/authentication for such access or distribution. In one or more embodiments, app store 110 can be a third party app store, an enterprise app store associated with an owner of communications device 106 or an employer of the owner, or a host app store associated with host server 101 and/or system 100.

In conventional systems, communications devices seeking to download a particular application will establish a direct connection to an app server that hosts the desired application. However, app stores have a number of limitations that can affect the architecture of deployed applications as well as the end-user experience. For example, app stores do not have the capability to manage relationships between applications. Thus, a provider of application suites must treat the applications included in the suite as either many standalone applications (so each application must include all relevant libraries and other supporting entities, even if such might otherwise be shared) or the entire suite must be provided as a monolithic package. In either case, there are shortcomings that cannot be adequately addressed by conventional app store deployment. Furthermore, because app stores do not maintain relationships between applications, app stores are unaware of various states or statuses of the communications devices such as available upgrades or updates, entitlements, and so forth. Hence, host server 101 can remedy or mitigate many of the deficiencies associated with app store deployment of applications by operating as a broker or proxy between communications device 106 and app store 110, as is further detailed herein.

System 100 can also include catalog component 112 that can be configured to examine catalog 114 maintained by host server 101. Catalog 114 can include device information 116 associated with communications device 106. For example, device information 116 can describe existing applications or other relevant information associated with communications device 106, which is described further with reference to FIG. 2A. Catalog 114 can also include app information 118 associated with application 108 such as, e.g., relationships with or dependencies upon other applications or entities. Additional detail associated with app information 118 can be found in connection with FIG. 2B. Catalog component 112 can further determine package 120 for communications device 106 in response to examination of catalog 114. Package 120 can include application 108 as well as other data, which is further described infra.

It is appreciated that catalog 114, maintained by host server 101 can be stored in data store 126. Data store 126 is intended to be a repository of all or portions of data, data sets, or information described herein or otherwise suitable for use with the claimed subject matter. Data store 126 can be centralized, either remotely or locally cached, or distributed, potentially across multiple devices and/or schemas. Furthermore, data store 126 can be embodied as substantially any type of memory, including but not limited to volatile or nonvolatile, solid state, sequential access, structured access, random access and so on. It should be understood that all or portions of data store 126 can be included in system 100, or can reside in part or entirely remotely from system 100.

System 100 can further include assembly component 122 that can be configured to construct package 120. For example, in response to catalog component 112 determining the contents of package 120 (e.g., application 108, additional entities, etc.), assembly component can assemble package 120. In addition, system 100 can include communications component 124 that be configured to receive application 108 from app store 110 and to transmit package 120 to communications device 106. It is to be understood that communications component 124 can be configured to receive various entities included in package 120 (further detailed in connection with FIG. 3B) from multiple different app stores 110. For instance, application 108 can be received from a third party app store, while other entities included in package 120 can be received from one or more different app stores. Moreover, all or a portion of such data propagation or other data transmissions can be by way of communications network 128, which can be the Internet or another wide area network or a local area network.

Figure 2A:
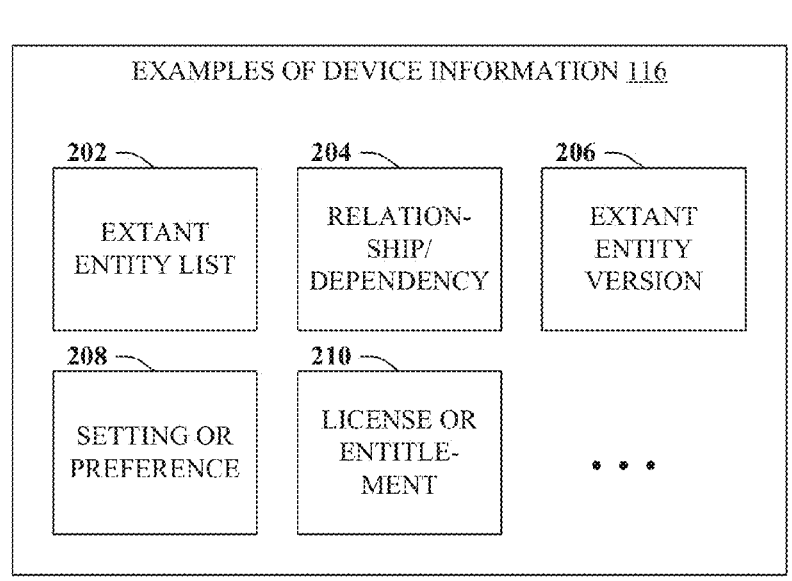
FIG. 2A depicts a block diagram of numerous non-limiting examples of device information.
Figure 2B:
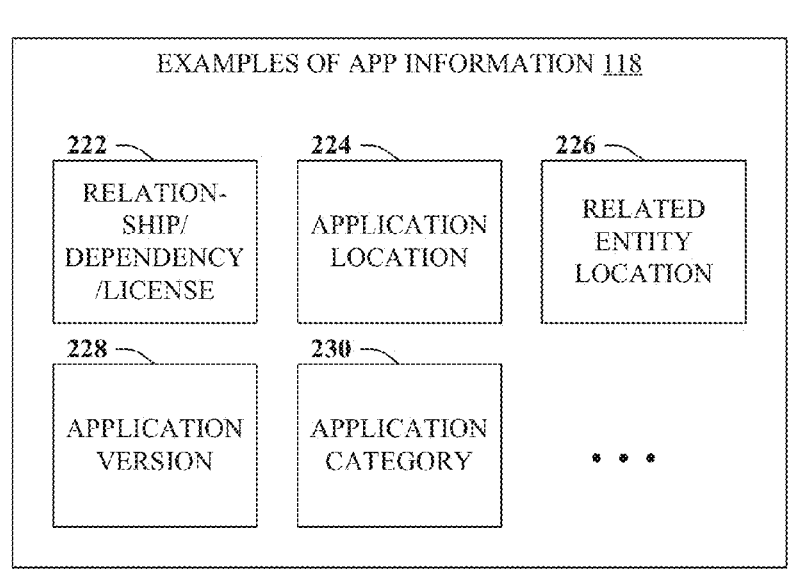
FIG. 2B depicts a block diagram of numerous non-limiting examples of app information.

Turning now to FIGS. 2A and 2B, various examples are provided. Examples described herein are intended to be for illustrative purposes and are not necessarily intended to be limiting in scope. FIG. 2A depicts block diagram 200 of numerous non-limiting examples of device information 116. In various embodiments, device information 116 can be a listing of all or a portion of extant entities included in the communications device 106, denoted here as extant entity list 202. An entity included in extant entity list 202 can be, e.g., an extant application or an extant library included in communications device 106. Thus, upon examination of device information 116, catalog component 112 can be apprised of existing data included on communications device 106, which can be useful in determining how to construct package 120. Additionally or alternatively, device information 116 can include all or a portion of relationships or dependencies regarding the extant entities, which is characterized by reference numeral 204. For instance, communications device 106 can include applications or other entities in which a relationship or dependency is shared with application 108, which can also be employed to determine package 120.

Extant entity version 206 represents another example of device information 116. For instance, a version of all or a portion of the extant entities can be included in device information 116. Based upon versions associated with entities included in communications device 106, a proper version of application 108 can be determined and/or various extant entities can be updated along with the deployment of application 108, which can be accomplished, e.g., by including such updates in package 120. Still another example of device information 116 can be setting or preference 208. Setting or preference 208 can relate to a setting or preference associated with acquisition of applications or entities. For example, setting or preference 208 can relate to the types of entities that are allowed, a particular source of entities, and so forth. Thus, setting or preference 208 can indicate, e.g., that productivity applications are allowed, but gaming applications are not; or that entities from one app store are preferred over another app store. Moreover, another example of device information 116 can be license or entitlement 210 associated with an extant entity or with the communications device 106. To illustrate, if communications device 106 is entitled to one or more future upgrades for an application (e.g., by virtue of a previous purchase of the application, etc.) then such upgrades can be included in package 120. However, it is understood that package 120 can be subject to setting or preference 208. Thus, even though communications device 106 is entitled to receive a particular application from a particular publisher (e.g., receive a free copy of a gaming app by the same publisher from whom a productivity app was previously purchased), that particular application might be disallowed due to setting or preference 208.

With reference now to FIG. 2B, block diagram 220 is illustrated, which depicts numerous non-limiting examples of app information 118. In one or more embodiment, app information 118 can include all or a portion of relationships or dependencies regarding the application (e.g., relationship/dependency/license 222). Thus, if application 108, initially requested by communications device by way of app request 104 expects or otherwise relies upon or operates in conjunction with other apps or entities or grants a license or entitlement to other apps or entities, then those other entities can be identified as well, and potentially included in package 120. Another example of data included in app information 118 can be application location 224 that can be leveraged to enable communications component 122 determine the location of application 108. Similarly, app information 118 can relate to a location of an entity to which application 108 is related or dependent, which is characterized by reference numeral 226. Thus, location information can be provided for all entities included in package 120. Appreciably, such location information is not necessarily a simple uniform resource locator or the like, but rather will typically be location information suitable for an app store, such as a manifest.

In addition, app information 118 can include application version 228 that describes a version identifier of application 108 and other related information Likewise, app information 118 can include application category 230 that describes a category (e.g., productivity, gaming, etc) of application 108 or other related information (e.g., publisher, features, etc.).

Figure 3A:
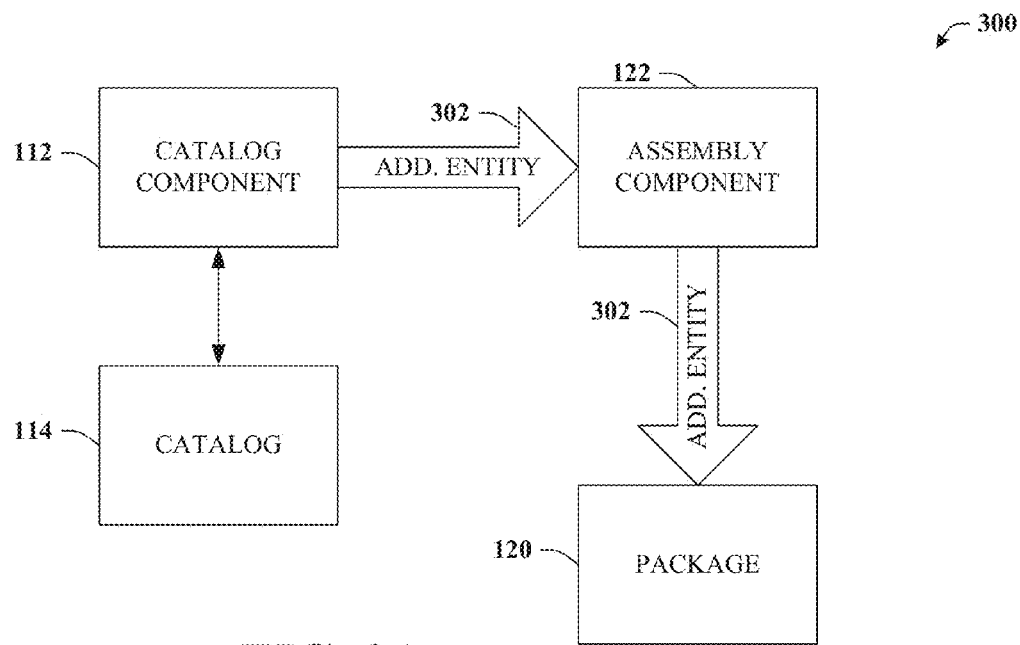
FIG. 3A illustrates a functional block diagram of an example system that illustrates additional features, aspects, or detail associated with the catalog component and the assembly component.

Referring now to FIG. 3A, system 300 that illustrates additional features, aspects, or detail associated with catalog component 112 and assembly component 122 is provided. As detailed in connection with system 100 of FIG. 1, catalog component 112 can be configured to examine catalog 114 and determine package 120. In response, assembly component 122 can construct package 120 in accordance with determinations provided by catalog component 112. In one or more embodiments, catalog component 112 can be further configured to determine additional entity 302 for package 120 and assembly component 122 can include additional entity 302 in package 120.

For example, catalog component 112 can identify additional entity 302 based upon examination of catalog 114, and therefore based upon information included in device information 116 and/or app information 118 detailed in connection with FIGS. 2A and 2B. As one example, catalog component 112 can be further configured to identify additional entity 302 based upon an entitlement (e.g., license or entitlement 210 or relationship/dependency/license 228) associated with communications device 106.

To further illustrate, consider a user of a mobile device (e.g., communications device 106) who desires to download a new application (e.g., application 108) that manages contacts, denoted app A. App A is provided by a developer that provides an entire suite of applications, such as an email application (app B) that can leverage the contacts included in app A, a short message service (SMS) application (app C), and a speech recognition app (app D) that can receive verbal commands as input and apply these commands as input to any of apps A-C. Therefore, app A has a relationship (and likely shared dependencies) with apps B-D. Consider further that the developer is running a promotion in which the purchase of any application included in the suite will entitle the purchaser to download a free copy of one of the other applications in the suite. Furthermore, the mobile device was pre-loaded with apps B and C (the email and SMS applications provided by the developer).

Thus, catalog component 112 can examine catalog 114 to determine that the mobile device is entitled to receive an additional application from among the applications included in the developer's suite, by virtue of purchasing app A. Catalog component 112 can also determine that apps B and C already reside on the user's phone, but that a newer version of app C is available. Hence, catalog component 112 can determine that app D and an associated library can be acquired as well based upon the entitlement created from purchasing app A. Assembly component 122 can therefore construct package 120 to include app A based upon app request 104 and further include app D, the library associated with app D, and the update associated with app C as additional entities 302. In addition, catalog component 112 can be further configured to determine an installation order for entities included in package 120. For instance, the installation order can be based upon relationships or dependencies or other information included in catalog 114. Regardless, assembly component 122 can include the installation order in package 120.

It is appreciated that such features can be beneficial to both the user and the developer. The developer can now leverage the benefits of modular design implementations for related applications while simultaneously leveraging the convenience (or in some cases necessity) of app store-based deployment that conventionally would preclude such modular design implementations. On the other hand, the user can be provided improved opportunities (e.g., updates, entitlements, etc.) and reap the benefits of more efficient app design (e.g., apps no longer need to be statically coded with shared libraries), which can save in terms of storage space, computation, and other resources. Additional benefits are further detailed herein.

Figure 3B:
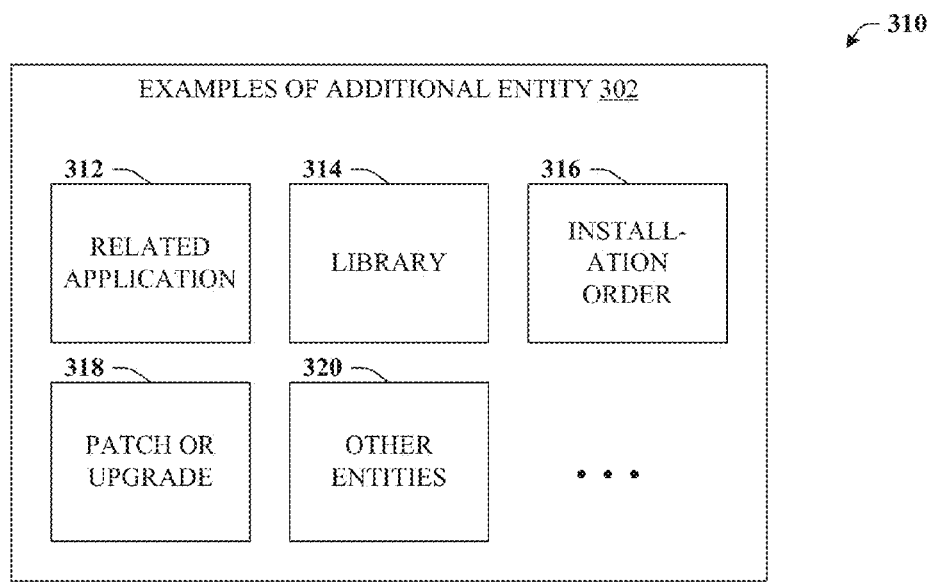
FIG. 3B illustrates a block diagram of various non-limiting examples of the additional entity.

Turning briefly to FIG. 3B, block diagram 310 provides various non-limiting examples of additional entity 302. In particular, additional entity 302 can be or can include related application 312 that is related to application 108 (e.g., a functional relationship such as a programmatic dependency, a business relationship such inclusion in a suite of applications from a common provider(s)). Additional entity 302 can also relate to library 314 that is required or recommended for proper execution of application 108. Furthermore, additional entity 302 can be installation order 316 that describes the order of installation for entities included in package 120 that is recommended for proper functionality. Likewise, additional entity 302 can be a patch or upgrade associated with application 108 or associated with other entities extant on communications device 106, or any other entities 320 suitable with the disclosed subject matter.

Figure 4A:
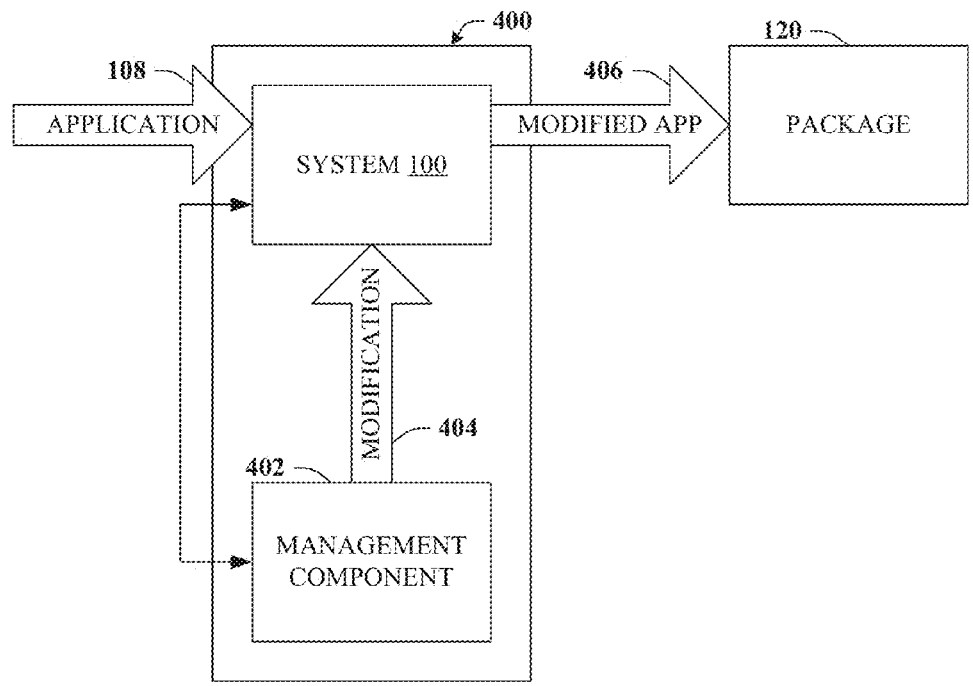
FIG. 4A illustrates a functional block diagram depicting an example system that can provide additional management features in connection with what is detailed herein.

With reference now to FIG. 4A, system 400 is depicted. System 400 can provide additional management features in connection with what is detailed herein. For example, system 400 can include all or portions of system 100 that can receive application 108 (e.g., from app store 110) and include application 108, possibly along with additional entities 302, in package 120. Package 120 can thereafter be transmitted to communications device 106.

In addition, system 400 can include management component 402 that can be configured to modify application 108. In particular, management component 402 can provide modification 404, which can be applied to application 108 in order to produce modified application 406. Hence, modified application 406 and/or the combination of application 108 and modification 404 can be included in package 120 prior to transmission to communications device 106. In one or more embodiment, management component 402 can modify application 108 to include at least one of enhanced security features, enhanced encryption features, enhanced management features, or the like, various non-limiting examples of which are provided with reference to FIG. 4B.

Figure 4B:
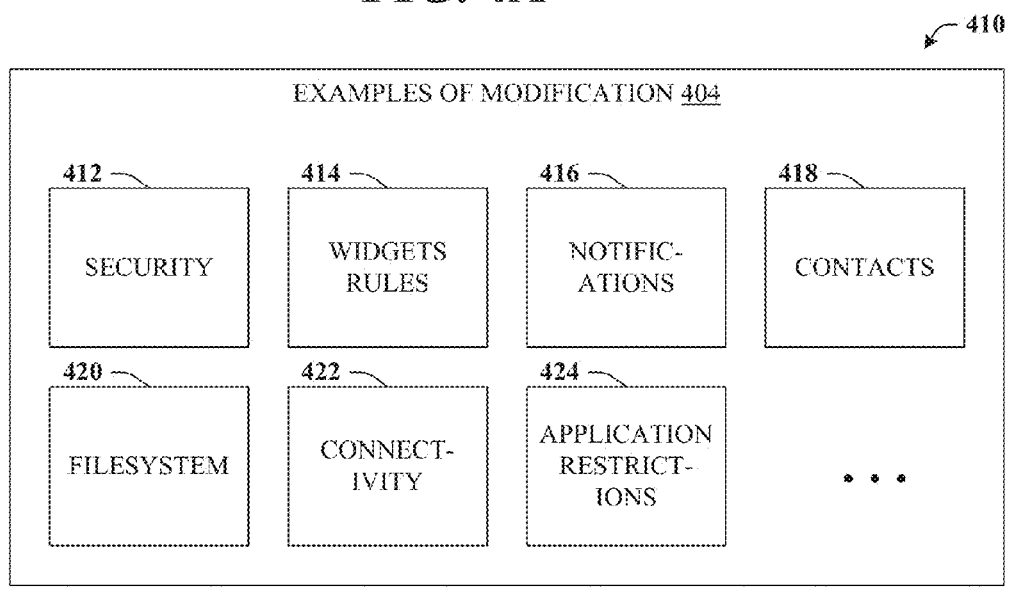
FIG. 4B illustrates a block diagram of various non-limiting examples of the modification to an application that is included in the package.

Turning now to FIG. 4B, illustration 410 is provided. Illustration 410 depicts various non-limiting examples of modification 404 that can be applied to application 108 in order to construct modified application 406. In one or more embodiments, the security of application 108 can be modified as depicted by reference numeral 412. For example, application 108 can be modified to access or leverage an encrypted database rather than native content providers. As another example, applications that utilize or provide widgets can be modified to display such widgets according to certain rules, which is denoted as widget rules 414. For example, widgets can be implemented only when device 106 is in a particular contextual role (e.g., display widget when business role/persona is active, but do not load widget(s) when in personal role/persona).

Notifications 416 represents yet another example of modification 404. For instance, once more based upon a particular contextual role, application 108 (e.g., a notification application) can be modified to display business notifications when in, e.g., a personal role, yet might or might not display personal-based notifications when in a business role. Application 108 can also be modified to manipulate contacts based upon a contextual role as well, which is represented by contacts 418. For example, modification 404 can ensure that contacts referenced by application 108 reference business contacts rather than native system contacts.

Filesystem 420 represents another example of modification 404. In particular, application 108 can be modified to leverage a container filesystem architecture (e.g., divide files) rather than a native filesystem architecture. Connectivity 422 represents an example modification 404 that pertains to a modification of application 108 to use container filesystem connectivity (e.g., a business virtual private network (VPN) tunnel) rather than connecting to the Internet via cell-data. Application restrictions 424 represents still another example of modification 404. For instance, application 108 can be modified with certain runtime or other restrictions 424. To illustrate, application 108 can be modified to run only during certain times of day or days of the week or month. Additionally or alternatively, application 108 can be modified to run only at certain locations (e.g., determined via global positioning satellite or other device related criteria). As another example, application 108 can be modified to run only if wireless fidelity (WI-FI) is active, and further only if device 106 is not in motion.

It is understood that all or a given modification 404 can be defined by an administrator such as an administrator for a company that provides device 106 and/or services associated with device 106. For instance a salesforce application might be modified to use business (role/persona) contacts yet not modified to use business VPN/connectivity 422. Where the administrator has not enforced certain criteria (e.g., the connectivity 422 in this case), a user can select criteria based upon his or her preference.

Managing Download of Applications

While much of the previous description relates to a server-side implementation, many features discussed herein can also be utilized in connection with a suitable client-side implementation.

Figure 5:
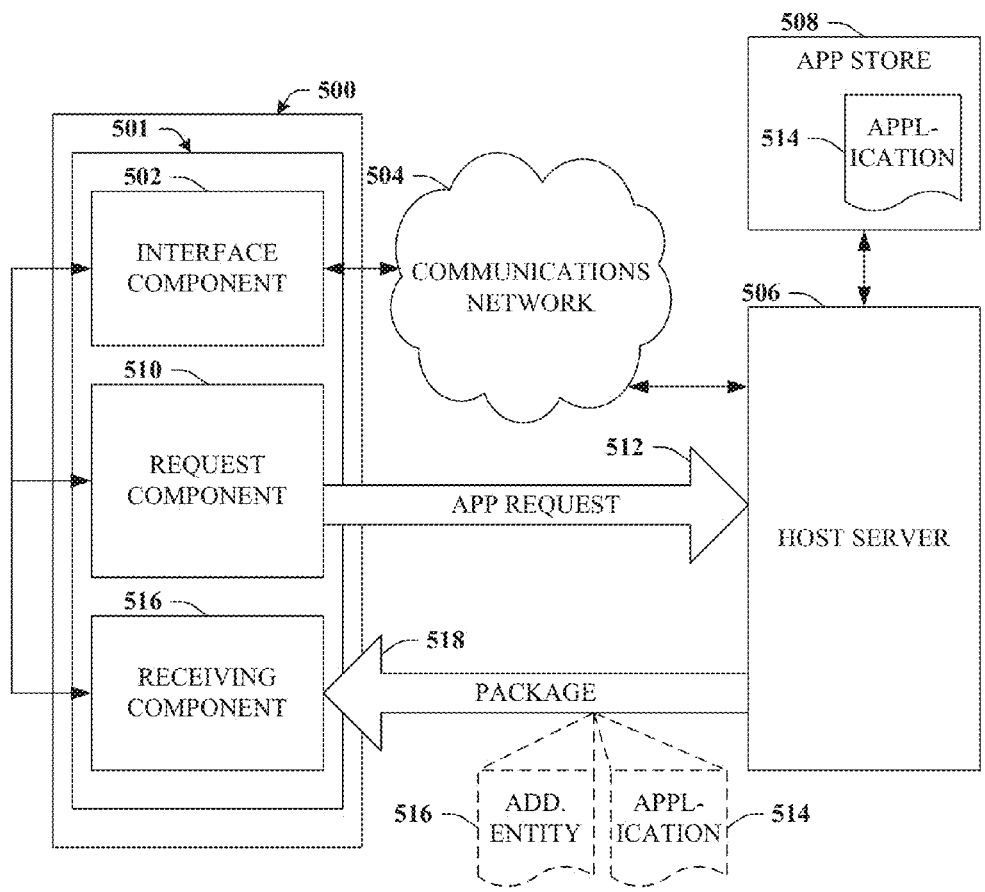
FIG. 5 illustrates a high-level functional block diagram of an example system that can manage download of applications.

Referring now to FIG. 5, system 500 that can manage download of applications is illustrated. System 500 can include communications device 501 operatively coupled to communications network 504. Elements 501 and 504 can be substantially similar to communications device 106 and communications network 128, respectively, detailed with respect to FIG. 1. For example, communications device 501 can be a mobile device that utilizes a mobile operating system. Numerous other similarities can be readily recognized, and thus details relating to components or elements detailed supra can be extended to similar components or elements now described.

System 500 can also include interface component 502 that can be configured to interface by way of communications network 504 to host server 506 that operates as an intermediary between communications device 501 and app store 508. System 500 can include request component 510 that can be configured to transmit, either directly or by way of interface component 502, to host server 506 app request 512 that requests application 514 that resides at app store 508. Thus, even though application 514 resides at app store 508, request 512 can be provided to host server 506 rather than directly to app store 508 as is done conventionally.

Further, system 500 can include receiving component 516 that can be configured to receive (either directly or by way of interface component 502) from host server 506 package 518 that includes at least application 514. In one or more embodiment, package 518 can further include (in addition to application 514) additional entity 516. Additional entity 516 can be, e.g., an additional application related to the application or related to an application extant on communications device 501, a library associated with application 514 or with the additional application, an update or upgrade associated with application 514 or with the additional application, an installation order associated with entities included in package 518, and so forth. It is appreciated that additional entity 516 can include a modification of package 516 similar to that described in connection with modification 404 as well as the entities detailed in connection with FIG. 3B.

Moreover, it is understood that host servers 101, 506 can be configured to operate as an intermediary between a user device (e.g., devices 106, 501) that are instructed to retrieve information from an app store (e.g., app store 110, 508). In some embodiments, host servers 101, 506 can intercept or otherwise broker the exchange between a user device and the app store. Such can be accomplished according to a variety of implementations. For example, a client-side redirect of all app requests to the intermediary (e.g., host server 101 or 506) can be implemented. As another example, host server 101 or 506 can act as a meta app store. As still another alternative, an intermediary app can be executed on the client (e.g., device 106, 501). Depending upon the particular implementation, data stores and/or triggers can be stored at the client, at a cloud, at an enterprise associated with device 106 or service provider thereof, or at the app store. Such triggers can be predefined (e.g., only via F5 VPN or only with specified app stores . . . ) or rules-based (e.g., no games or only if a particular dependency is present . . . ) as detailed herein.

Figure 6:
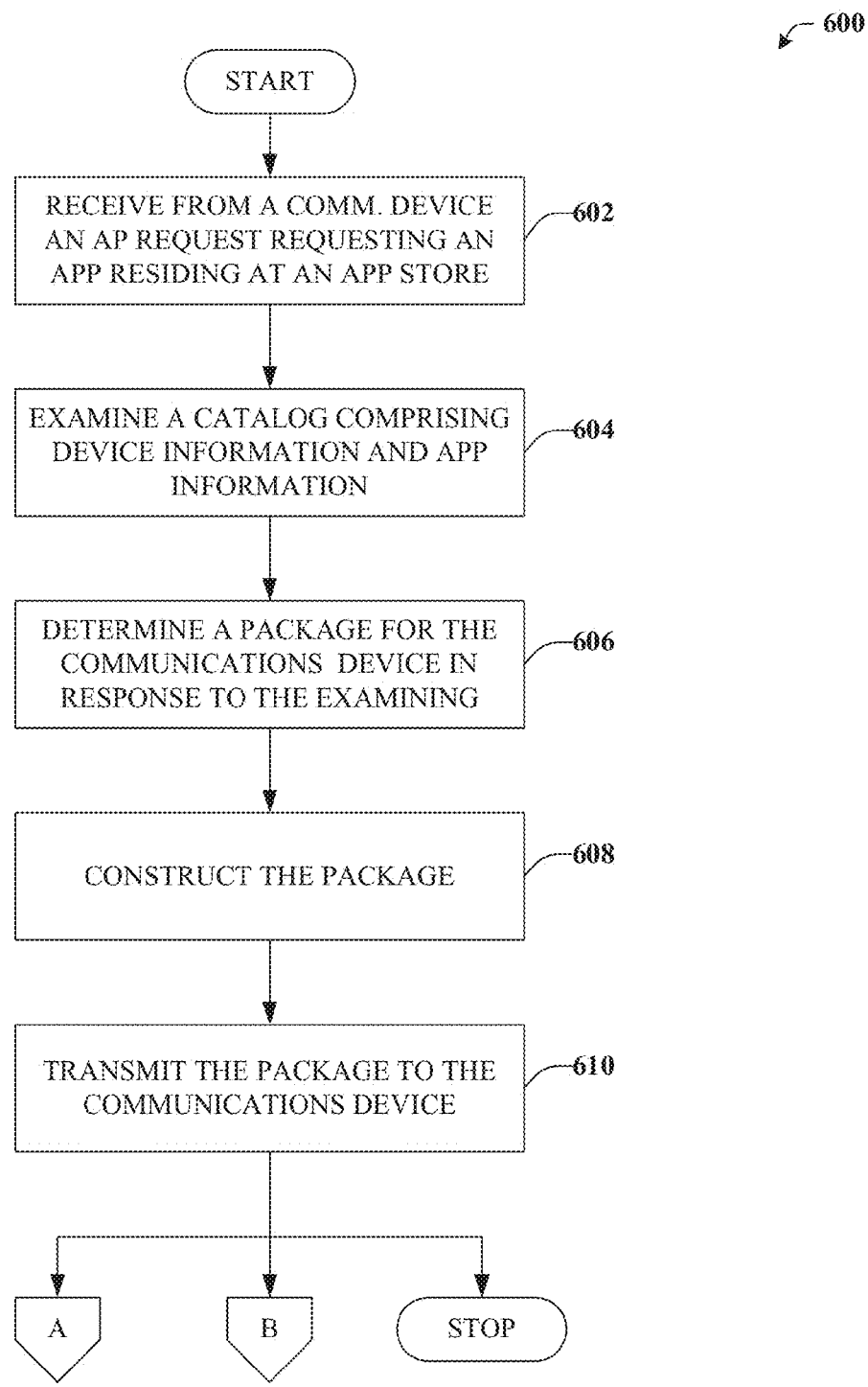
FIG. 6 illustrates an example methodology for managing deployment of applications.
Figure 7:
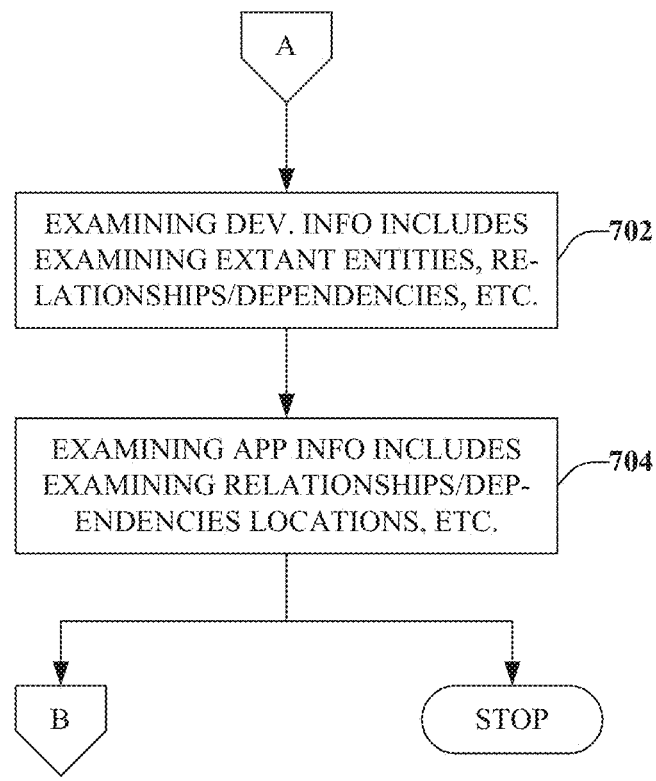
FIG. 7 illustrates an example methodology for providing various non-limiting examples related to examining the catalog.
Figure 8:
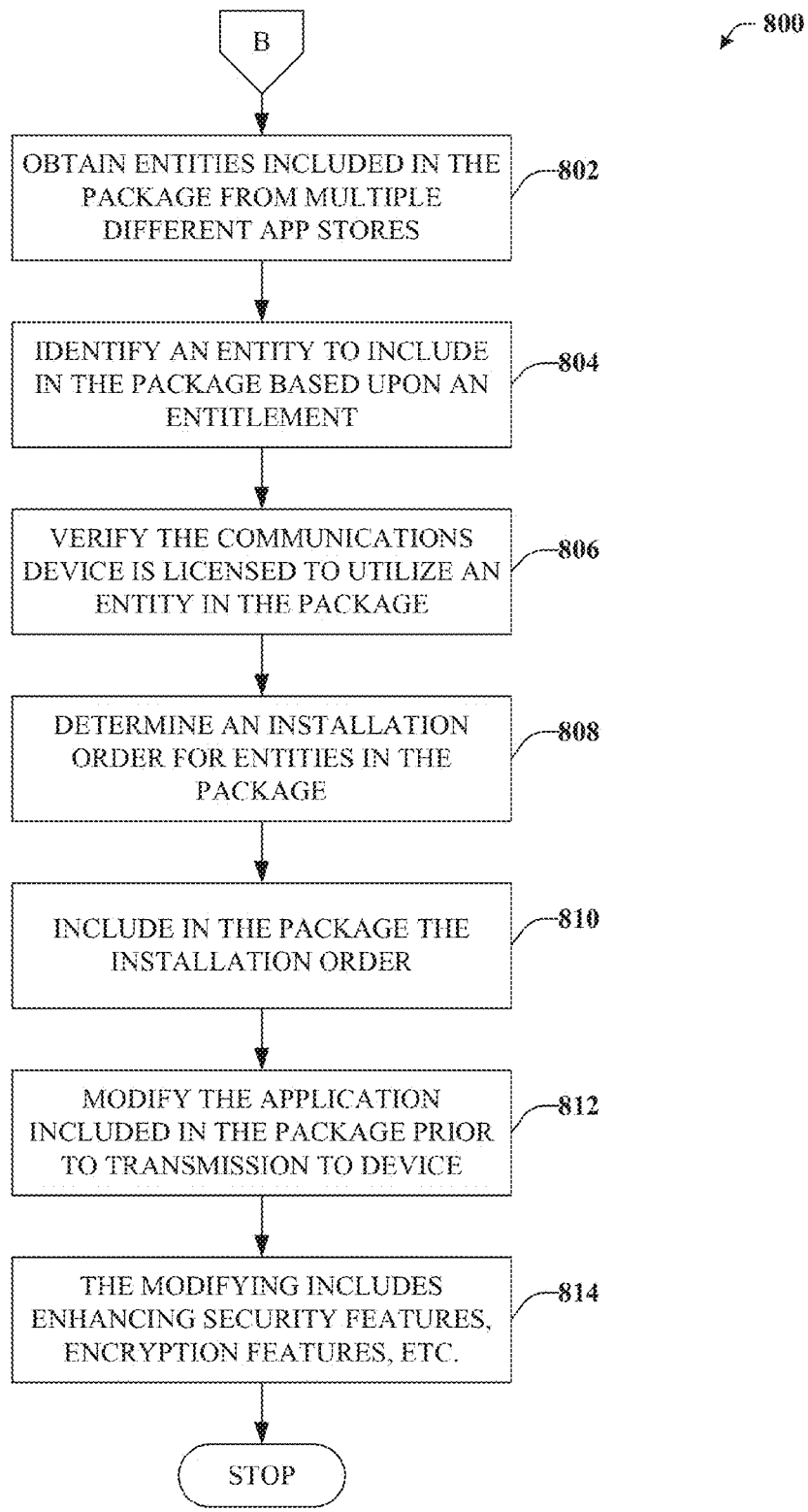
FIG. 8 illustrates an example methodology for providing additional non-limiting features or aspects in connection with deployment of applications.

FIGS. 6-8 illustrate various methodologies in accordance with the disclosed subject matter. While, for purposes of simplicity of explanation, the methodologies are shown and described as a series of acts, it is to be understood and appreciated that the disclosed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the disclosed subject matter. Additionally, it should be further appreciated that the methodologies disclosed hereinafter and throughout this specification are capable of being stored on an article of manufacture to facilitate transporting and transferring such methodologies to computers Referring now to FIG. 6, exemplary method 600 for managing deployment of applications is depicted. Generally, at reference numeral 602, a communications network can be employed for receiving from a communications device an app request requesting an application residing at an app store. Thus, transactions between the communications device and the app store can be brokered by an intermediary according to the disclosed method.

At reference numeral 604, a catalog can be examined, where examining the catalog comprises examining device information associated with the communications device and examining app information associated with the application. Accordingly, at reference numeral 606, a package can be determined for the communications device in response to the app request. The package can further be determined based upon the examining of the catalog (e.g., device information and app information). Generally, the package will include at least the application or, in some cases, a modified version of the application.

Once the contents of the package are determined, at reference numeral 608, the package can be constructed by including the various constituent portions. Thus, at reference numeral 610, the package can be transmitted to the communications device.

Turning now to FIG. 7, example method 700 is illustrated. Method 700 provides various non-limiting examples related to examining the catalog. In particular, examining the catalog, as detailed in connection with reference numeral 604 of FIG. 6, can include specific examinations of device information and app information. At reference numeral 702, examining device information can include examining at least one of: (1) a listing of all or a portion of extant entities included in the communications device, wherein an entity is at least one of an extant application or an extant library, (2) all or a portion of relationships or dependencies regarding the extant entities, (3) a version of all or a portion of the extant entities, (4) a setting or preference associated with acquisition of applications or an extant entity, or (5) a license or entitlement associated with an extant entity or the communications device.

Similarly, at reference numeral 704, examining app information can include examining at least one of: (1) all or a portion of relationships, dependencies, or licenses regarding the application, (2) a location of the application, (3) a location of an entity to which the application is related, (4) a version of the application, or (5) a category of the application.

Referring to FIG. 8, example method 800 is depicted. Method 800 provides additional non-limiting features or aspects in connection with deployment of applications. At reference numeral 802, entities determined to be included in the package (e.g., at reference numeral 606) can be obtained from multiple different app stores. Thus, the disclosed subject matter is not limited to providing an intermediary between the communications device and a single app store.

Moreover, identifying the entities to include in the package can be provided based upon an examination of the various information included in the catalog. For example, at reference numeral 804, an entity to include in the package can be identified based upon an entitlement associated with the communications device (e.g., based upon device information in this case). Other examples are of course possible utilizing other portions of the catalog. As another example, at reference numeral 806, it can be verified that the communications device is licensed to utilize an entity included in the package. For instance, if the communications device is not licensed to utilize a particular entity, that entity can be excluded from the package such as when the determinations of entities to include in the package are made.

Moreover, at reference numeral 808, an installation order for entities included in the package can be determined based upon relationships or dependencies associated with those entities. Thus, at reference numeral 810, an indication of the installation order can be included in the package. Hence, in cases where it can be beneficial to install certain entities before other entities (e.g., as derived from the catalog), such information can be passed on to the communications device to aid in the actual installation.

While it is evident that the package can include entities in addition to the application requested by the app request, in some cases, the application itself can be modified. For example, at reference numeral 812, the application included in the package can be modified prior to transmission to the communications device. More specifically, at reference numeral 814, the modifying of the application can include at least one of enhancing security features associated with the application, enhancing encryption features associated with the application, or enhancing management features associated with the application.

Example Operating Environments

Figure 9:
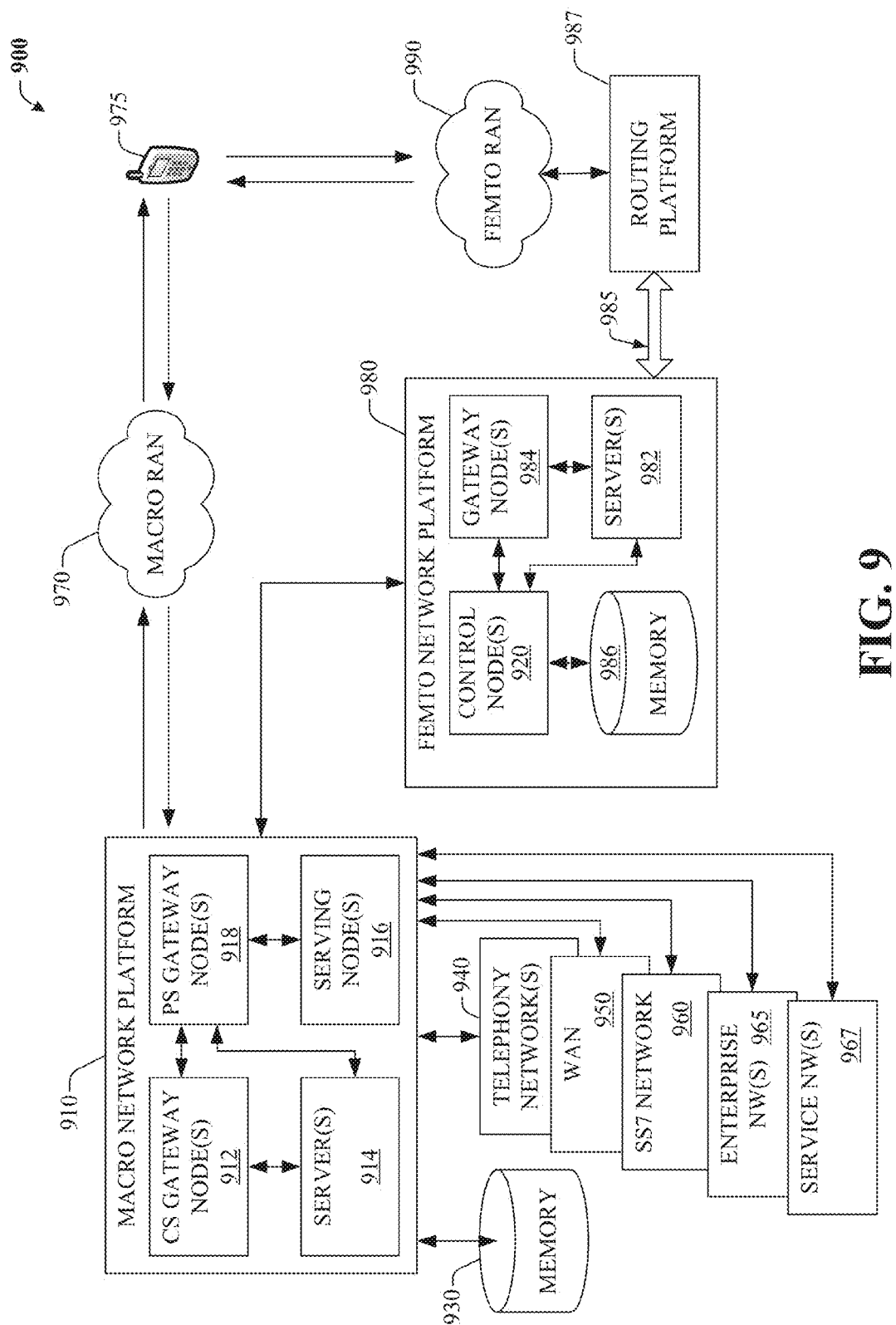
FIG. 9 illustrates an example wireless communication environment with associated components that can enable operation of an enterprise network in accordance with aspects described herein.

To provide further context for various aspects of the subject specification, FIG. 9 illustrates an example wireless communication environment 900, with associated components that can enable operation of a femtocell enterprise network in accordance with aspects described herein. Wireless communication environment 900 includes two wireless network platforms: (i) A macro network platform 910 that serves, or facilitates communication) with user equipment 975 via a macro radio access network (RAN) 970. It should be appreciated that in cellular wireless technologies (e.g., 4G, 3GPP UMTS, HSPA, 3GPP LTE, 3GPP UMB), macro network platform 910 is embodied in a Core Network. (ii) A femto network platform 980, which can provide communication with UE 975 through a femto RAN 990, linked to the femto network platform 980 through a routing platform 92 via backhaul pipe(s) 985. It should be appreciated that femto network platform 980 typically offloads UE 975 from macro network, once UE 975 attaches (e.g., through macro-to-femto handover, or via a scan of channel resources in idle mode) to femto RAN.

It is noted that RAN includes base station(s), or access point(s), and its associated electronic circuitry and deployment site(s), in addition to a wireless radio link operated in accordance with the base station(s). Accordingly, macro RAN 970 can comprise various coverage cells like cell 1105, while femto RAN 990 can comprise multiple femto access points. As mentioned above, it is to be appreciated that deployment density in femto RAN 990 is substantially higher than in macro RAN 970.

Generally, both macro and femto network platforms 910 and 980 include components, e.g., nodes, gateways, interfaces, servers, or platforms, that facilitate both packet-switched (PS) (e.g., internet protocol (IP), frame relay, asynchronous transfer mode (ATM)) and circuit-switched (CS) traffic (e.g., voice and data) and control generation for networked wireless communication. In an aspect of the subject innovation, macro network platform 910 includes CS gateway node(s) 912 which can interface CS traffic received from legacy networks like telephony network(s) 940 (e.g., public switched telephone network (PSTN), or public land mobile network (PLMN)) or a SS7 network 960. Circuit switched gateway 912 can authorize and authenticate traffic (e.g., voice) arising from such networks. Additionally, CS gateway 912 can access mobility, or roaming, data generated through SS7 network 960; for instance, mobility data stored in a VLR, which can reside in memory 930. Moreover, CS gateway node(s) 912 interfaces CS-based traffic and signaling and gateway node(s) 918. As an example, in a 3GPP UMTS network, gateway node(s) 918 can be embodied in gateway GPRS support node(s) (GGSN).

In addition to receiving and processing CS-switched traffic and signaling, gateway node(s) 918 can authorize and authenticate PS-based data sessions with served (e.g., through macro RAN) wireless devices. Data sessions can include traffic exchange with networks external to the macro network platform 910, like wide area network(s) (WANs) 950; it should be appreciated that local area network(s) (LANs) can also be interfaced with macro network platform 910 through gateway node(s) 918. Gateway node(s) 918 generates packet data contexts when a data session is established. To that end, in an aspect, gateway node(s) 918 can include a tunnel interface (e.g., tunnel termination gateway (TTG) in 3GPP UMTS network(s); not shown) which can facilitate packetized communication with disparate wireless network(s), such as Wi-Fi networks. It should be further appreciated that the packetized communication can include multiple flows that can be generated through server(s) 914. It is to be noted that in 3GPP UMTS network(s), gateway node(s) 918 (e.g., GGSN) and tunnel interface (e.g., TTG) comprise a packet data gateway (PDG).

Macro network platform 910 also includes serving node(s) 916 that convey the various packetized flows of information or data streams, received through gateway node(s) 918. As an example, in a 3GPP UMTS network, serving node(s) can be embodied in serving GPRS support node(s) (SGSN).

As indicated above, server(s) 914 in macro network platform 910 can execute numerous applications (e.g., location services, online gaming, wireless banking, wireless device management . . . ) that generate multiple disparate packetized data streams or flows, and manage (e.g., schedule, queue, format . . . ) such flows. Such application(s), for example can include add-on features to standard services provided by macro network platform 910. Data streams can be conveyed to gateway node(s) 918 for authorization/authentication and initiation of a data session, and to serving node(s) 916 for communication thereafter. Server(s) 914 can also effect security (e.g., implement one or more firewalls) of macro network platform 910 to ensure network's operation and data integrity in addition to authorization and authentication procedures that CS gateway node(s) 912 and gateway node(s) 918 can enact. Moreover, server(s) 914 can provision services from external network(s), e.g., WAN 950, or Global Positioning System (GPS) network(s) (not shown). It is to be noted that server(s) 914 can include one or more processor configured to confer at least in part the functionality of macro network platform 910. To that end, the one or more processor can execute code instructions stored in memory 930, for example.

In example wireless environment 900, memory 930 stores information related to operation of macro network platform 910. Information can include business data associated with subscribers; market plans and strategies, e.g., promotional campaigns, business partnerships; operational data for mobile devices served through macro network platform; service and privacy policies; end-user service logs for law enforcement; and so forth. Memory 930 can also store information from at least one of telephony network(s) 940, WAN(s) 950, or SS7 network 960, enterprise NW(s) 965, or service NW(s) 967.

Femto gateway node(s) 984 have substantially the same functionality as PS gateway node(s) 918. Additionally, femto gateway node(s) 984 can also include substantially all functionality of serving node(s) 916. In an aspect, femto gateway node(s) 984 facilitates handover resolution, e.g., assessment and execution. Further, control node(s) 920 can receive handover requests and relay them to a handover component (not shown) via gateway node(s) 984. According to an aspect, control node(s) 920 can support RNC capabilities.

Server(s) 982 have substantially the same functionality as described in connection with server(s) 914. In an aspect, server(s) 982 can execute multiple application(s) that provide service (e.g., voice and data) to wireless devices served through femto RAN 990. Server(s) 982 can also provide security features to femto network platform. In addition, server(s) 982 can manage (e.g., schedule, queue, format . . . ) substantially all packetized flows (e.g., IP-based, frame relay-based, ATM-based) it generates in addition to data received from macro network platform 910. It is to be noted that server(s) 982 can include one or more processor configured to confer at least in part the functionality of macro network platform 910. To that end, the one or more processor can execute code instructions stored in memory 986, for example.

Memory 986 can include information relevant to operation of the various components of femto network platform 980. For example operational information that can be stored in memory 986 can comprise, but is not limited to, subscriber information; contracted services; maintenance and service records; femto cell configuration (e.g., devices served through femto RAN 990; access control lists, or white lists); service policies and specifications; privacy policies; add-on features; and so forth.

It is noted that femto network platform 980 and macro network platform 910 can be functionally connected through one or more reference link(s) or reference interface(s). In addition, femto network platform 980 can be functionally coupled directly (not illustrated) to one or more of external network(s) 940, 950, 960, 965 or 967. Reference link(s) or interface(s) can functionally link at least one of gateway node(s) 984 or server(s) 986 to the one or more external networks 940, 950, 960, 965 or 967. The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated herein.

Figure 10:
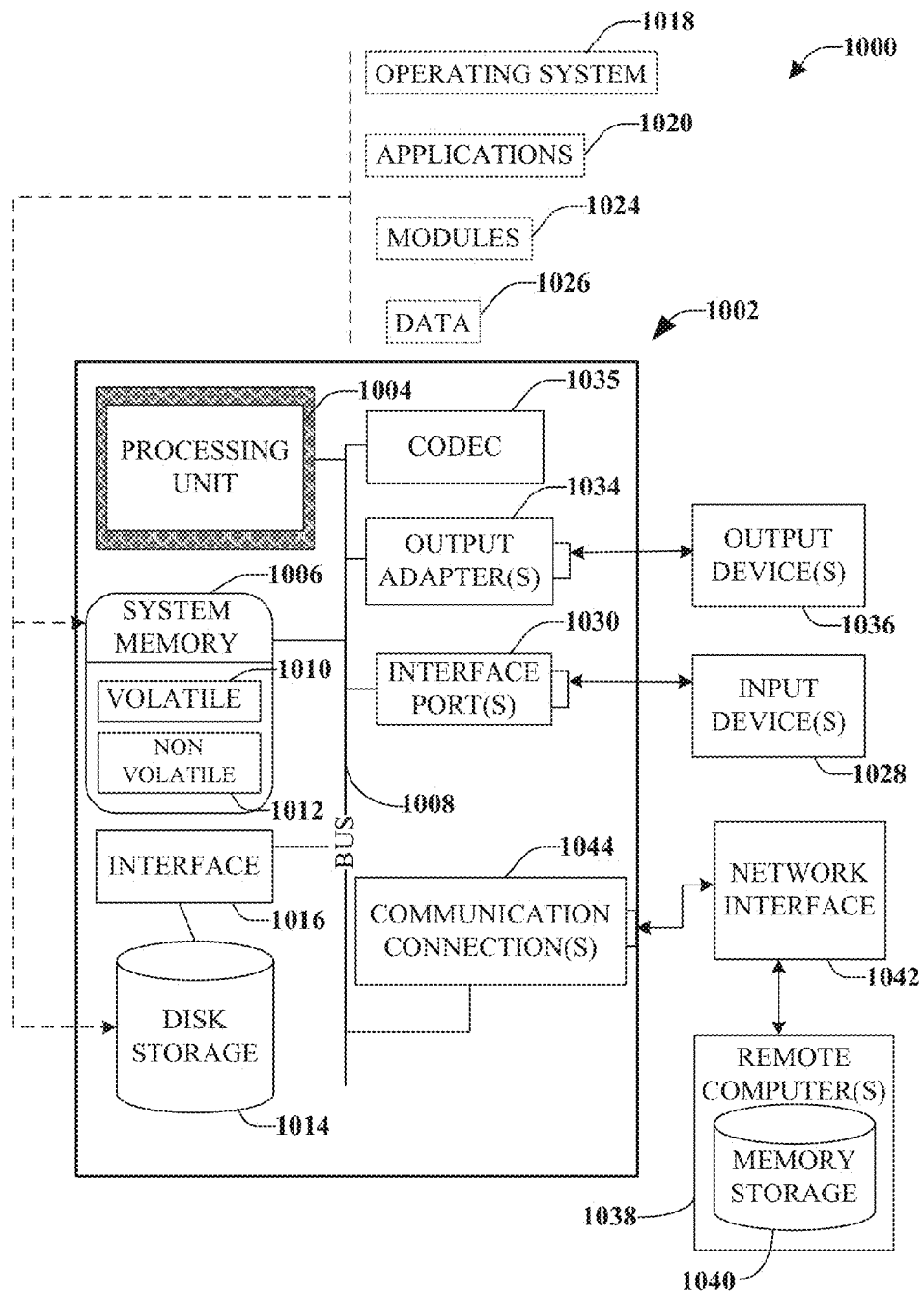
FIG. 10 illustrates a block diagram of a computer operable to execute or implement all or portions of the disclosed architecture.

With reference to FIG. 10, a suitable environment 1000 for implementing various aspects of the claimed subject matter includes a computer 1002. The computer 1002 includes a processing unit 1004, a system memory 1006, a codec 1005, and a system bus 1008. The system bus 1008 couples system components including, but not limited to, the system memory 1006 to the processing unit 1004. The processing unit 1004 can be any of various available processors. Dual microprocessors and other multiprocessor architectures also can be employed as the processing unit 1004.

The system bus 1008 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1006 includes volatile memory 1010 and non-volatile memory 1012. The basic input/output system (BIOS), containing the basic routines to transfer information between elements within the computer 1002, such as during start-up, is stored in non-volatile memory 1012. In addition, according to present innovations, codec 1005 may include at least one of an encoder or decoder, wherein the at least one of an encoder or decoder may consist of hardware, a combination of hardware and software, or software. Although, codec 1005 is depicted as a separate component, codec 1005 may be contained within non-volatile memory 1012. By way of illustration, and not limitation, non-volatile memory 1012 can include read only memory (ROM), programmable ROM (PROM), electrically programmable ROM (EPROM), electrically erasable programmable ROM (EEPROM), or flash memory. Volatile memory 1010 includes random access memory (RAM), which acts as external cache memory. According to present aspects, the volatile memory may store the write operation retry logic (not shown in FIG. 10) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM.

Computer 1002 may also include removable/non-removable, volatile/non-volatile computer storage medium. FIG. 10 illustrates, for example, disk storage 1014. Disk storage 1014 includes, but is not limited to, devices like a magnetic disk drive, solid state disk (SSD) floppy disk drive, tape drive, Jaz drive, Zip drive, LS-100 drive, flash memory card, or memory stick. In addition, disk storage 1014 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1014 to the system bus 1008, a removable or non-removable interface is typically used, such as interface 1016.

It is to be appreciated that FIG. 10 describes software that acts as an intermediary between users and the basic computer resources described in the suitable operating environment 1000. Such software includes an operating system 1018. Operating system 1018, which can be stored on disk storage 1014, acts to control and allocate resources of the computer system 1002. Applications 1020 take advantage of the management of resources by operating system 1018 through program modules 1024, and program data 1026, such as the boot/shutdown transaction table and the like, stored either in system memory 1006 or on disk storage 1014. It is to be appreciated that the claimed subject matter can be implemented with various operating systems or combinations of operating systems.

A user enters commands or information into the computer 1002 through input device(s) 1028. Input devices 1028 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1004 through the system bus 1008 via interface port(s) 1030. Interface port(s) 1030 include, for example, a serial port, a parallel port, a game port, and a universal serial bus (USB). Output device(s) 1036 use some of the same type of ports as input device(s) 1028. Thus, for example, a USB port may be used to provide input to computer 1002 and to output information from computer 1002 to an output device 1036. Output adapter 1034 is provided to illustrate that there are some output devices 1036 like monitors, speakers, and printers, among other output devices 1036, which require special adapters. The output adapters 1034 include, by way of illustration and not limitation, video and sound cards that provide a means of connection between the output device 1036 and the system bus 1008. It should be noted that other devices and/or systems of devices provide both input and output capabilities such as remote computer(s) 1038.

Computer 1002 can operate in a networked environment using logical connections to one or more remote computers, such as remote computer(s) 1038. The remote computer(s) 1038 can be a personal computer, a server, a router, a network PC, a workstation, a microprocessor based appliance, a peer device, a smart phone, a tablet, or other network node, and typically includes many of the elements described relative to computer 1002. For purposes of brevity, only a memory storage device 1040 is illustrated with remote computer(s) 1038. Remote computer(s) 1038 is logically connected to computer 1002 through a network interface 1042 and then connected via communication connection(s) 1044. Network interface 1042 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1044 refers to the hardware/software employed to connect the network interface 1042 to the bus 1008. While communication connection 1044 is shown for illustrative clarity inside computer 1002, it can also be external to computer 1002. The hardware/software necessary for connection to the network interface 1042 includes, for exemplary purposes only, internal and external technologies such as, modems including regular telephone grade modems, cable modems and DSL modems, ISDN adapters, and wired and wireless Ethernet cards, hubs, and routers.

Figure 11:
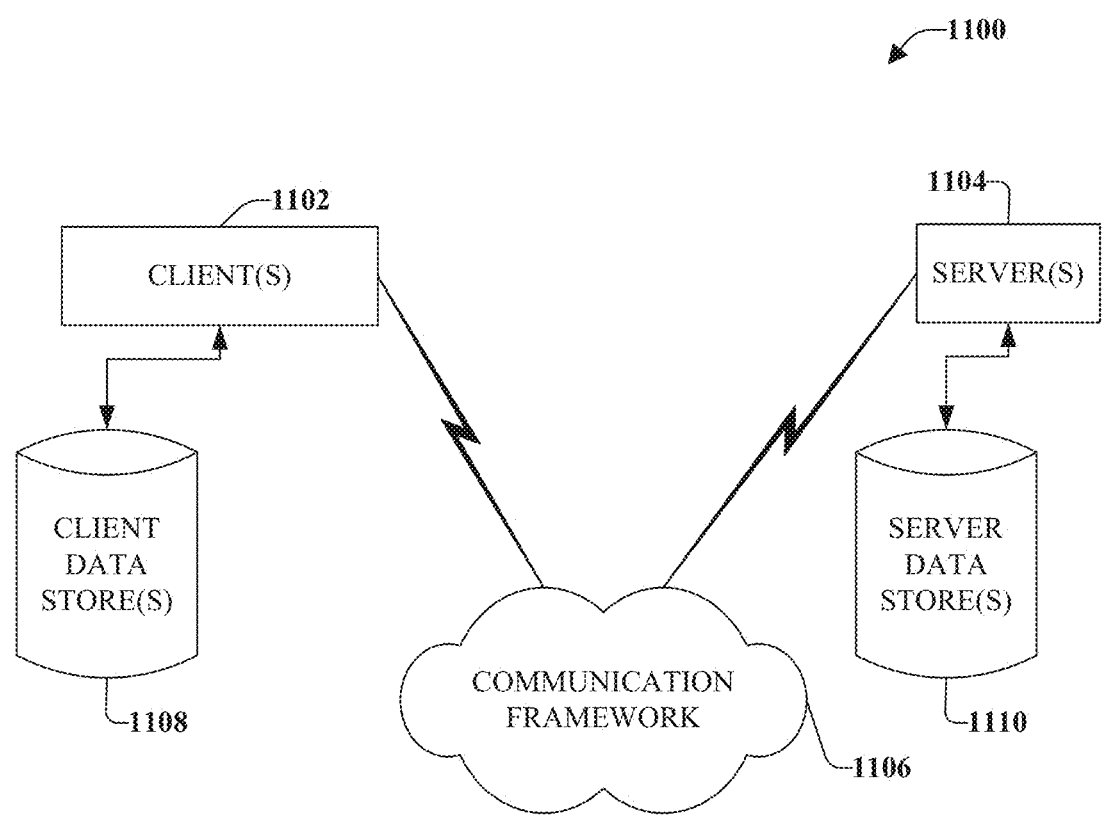
FIG. 11 illustrates a schematic block diagram of an exemplary computing environment.

Referring now to FIG. 11, there is illustrated a schematic block diagram of a computing environment 1100 in accordance with this specification. The system 1100 includes one or more client(s) 1102 (e.g., laptops, smart phones, PDAs, media players, computers, portable electronic devices, tablets, and the like). The client(s) 1102 can be hardware and/or software (e.g., threads, processes, computing devices). The system 1100 also includes one or more server(s) 1104. The server(s) 1104 can also be hardware or hardware in combination with software (e.g., threads, processes, computing devices). The servers 1104 can house threads to perform transformations by employing aspects of this disclosure, for example. One possible communication between a client 1102 and a server 1104 can be in the form of a data packet transmitted between two or more computer processes wherein the data packet may include video data. The data packet can include a cookie and/or associated contextual information, for example. The system 1100 includes a communication framework 1106 (e.g., a global communication network such as the Internet, or mobile network(s)) that can be employed to facilitate communications between the client(s) 1102 and the server(s) 1104.

Communications can be facilitated via a wired (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

In one embodiment, a client 1102 can transfer an encoded file, in accordance with the disclosed subject matter, to server 1104. Server 1104 can store the file, decode the file, or transmit the file to another client 1102. It is to be appreciated, that a client 1102 can also transfer uncompressed file to a server 1104 and server 1104 can compress the file in accordance with the disclosed subject matter. Likewise, server 1104 can encode video information and transmit the information via communication framework 1106 to one or more clients 1102.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described herein can include electrical circuit(s) that can include components and circuitry elements of suitable value in order to implement the embodiments of the subject innovation(s). Furthermore, it can be appreciated that many of the various components can be implemented on one or more integrated circuit (IC) chips. For example, in one embodiment, a set of components can be implemented in a single IC chip. In other embodiments, one or more of respective components are fabricated or implemented on separate IC chips.

What has been described above includes examples of the embodiments of the present invention. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims. Moreover, the above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize. Moreover, use of the term "an embodiment" or "one embodiment" throughout is not intended to mean the same embodiment unless specifically described as such.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer readable medium; or a combination thereof.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Computing devices typically include a variety of media, which can include computer-readable storage media and/or communications media, in which these two terms are used herein differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal that can be transitory such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

In view of the exemplary systems described above, methodologies that may be implemented in accordance with the described subject matter will be better appreciated with reference to the flowcharts of the various figures. For simplicity of explanation, the methodologies are depicted and described as a series of acts. However, acts in accordance with this disclosure can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be appreciated that the methodologies disclosed in this specification are capable of being stored on an article of manufacture to facilitate transporting and transferring such methodologies to computing devices. The term article of manufacture, as used herein, is intended to encompass a computer program accessible from any computer-readable device or storage media.

What is claimed is:

1. A system that manages distribution of applications, comprising:
   a host server operatively coupled to a communications network, the host server comprising:
      a receiving component configured to receive an app (application) request from a communications device that requests an application that resides at an app store;
      a catalog component configured to examine a catalog maintained by the host server, the catalog includes device information associated with the communications device and app information associated with the application, and determine a package for the communications device in response to examination of the catalog, the package includes the application;
      an assembly component configured to construct the package; and
      a communications component configured to receive the application from the app store, receive entities included in the package from another app store, and transmit the package to the communications device.

2. The system of claim 1, wherein the communications device is a mobile device that utilizes a mobile operating system.

3. The system of claim 1, wherein the device information includes at least one of a listing of all or a portion of extant entities included in the communications device, wherein an entity is at least one of an extant application or an extant library, all or a portion of relationships or dependencies regarding the extant entities, a version of all or a portion of the extant entities, a setting or preference associated with acquisition of applications or entities, or a license or entitlement associated with an extant entity or the communications device.

4. The system of claim 1, wherein the app information includes at least one of all or a portion of relationships or dependencies regarding the application, a location of the application, a location of an entity to which the application is related, a version of the application, or a category of the application.

5. The system of claim 1, wherein the app store includes an application distribution server configured to deploy applications to the communications device.

6. The system of claim 5, wherein the app store is at least one of a third party app store, an enterprise app store associated with an owner of the communications device or an employer of the owner, or a host app store associated with the host server.

7. The system of claim 1, wherein the catalog component is further configured to determine an additional entity for the package and the assembly component includes the additional entity in the package.

8. The system of claim 7, wherein the catalog component is further configured to identify the additional entity based upon an entitlement associated with the communications device.

9. The system of claim 1, wherein the catalog component is further configured to verify the communications device is licensed to utilize entities included in the package.

10. The system of claim 1, wherein the catalog component is further configured to determine an installation order for entities included in the package based upon relationships or dependencies and the assembly component includes the installation order in the package.

11. The system of claim 1, further comprising a management component configured to modify the application included in the package prior to transmission to the communications device.

12. The system of claim 11, wherein management component modifies the application to include at least one of enhanced security features, enhanced encryption features, or enhanced management features.

13. A system that manages download of applications, comprising:
   a communications device operatively coupled to a communications network, the communications device comprising:
      an interface component configured to interface by way of the communications network to a host server that operates as an intermediary between the communications device and app (application) stores;
      a request component configured to transmit to the host server an app request that requests an application that resides at the app store; and
      a receiving component configured to receive from the host server a package that includes the application received from a first app store of the app stores and an object that differs from the application received from a second app store of the app stores.

14. The system of claim 13, wherein the communications device is a mobile device that utilizes a mobile operating system.

15. The system of claim 13, wherein the package further includes another object, wherein the other object is at least one of an additional application related to the application, a library associated with the application or the additional application, an update or upgrade associated with the application or the additional application, or an installation order associated with objects included in the package.

16. A method for managing deployment of applications, comprising:
   employing a communications network for receiving from a communications device an app (application) request requesting an application residing at a first app store;
   employing a processor for examining a catalog, comprising:
      examining device information associated with the communications device; and
      examining app information associated with the application;
   determining a package for the communications device in response to the examining, the package including at least the application and an entity received from a second app store;
   constructing the package; and
   transmitting the package to the communications device.

17. The method of claim 16, wherein examining device information includes examining at least one of: a listing of all or a portion of extant entities included in the communications device, wherein an entity is at least one of an extant application or an extant library, all or a portion of relationships or dependencies regarding the extant entities, a version of all or a portion of the extant entities, a setting or preference associated with acquisition of applications or an extant entity, or a license or entitlement associated with an extant entity or the communications device.

18. The method of claim 16, wherein examining app information includes examining at least one of: all or a portion of relationships, dependencies, or licenses regarding the application, a location of the application, a location of an entity to which the application is related, a version of the application, or a category of the application.

19. The method of claim 16, further comprising identifying an entity to include in the package based upon an entitlement associated with the communications device.

20. The method of claim 16, further comprising verifying the communications device is licensed to utilize an entity included in the package.

21. The method of claim 16, further comprising determining an installation order for entities included in the package based upon relationships or dependencies associated with the entities.

22. The method of claim 21, further comprising including in the package an indication of the installation order.

23. The method of claim 16, further comprising modifying the application included in the package prior to transmission to the communications device.

24. The method of claim 23, wherein the modifying including at least one of enhancing security features associated with the application, enhancing encryption features associated with the application, or enhancing management features associated with the application.

25. The system of claim 13, wherein the object is identified based on an entitlement associated with the communications device.

26. The system of claim 13, further comprising an installation component that determines an installation order for objects included in the package based on relationships or dependencies associated with the objects.

* * * * *

UNITED STATES PATENT AND TRADEMARK OFFICE
CERTIFICATE OF CORRECTION

| | | |
|---|---|---|
| PATENT NO. | : 8,725,124 B2 | Page 1 of 1 |
| APPLICATION NO. | : 13/412263 | |
| DATED | : May 13, 2014 | |
| INVENTOR(S) | : Andrew Jong Kein Toy, Alexander Allan Trewby and David Wei Zhu | |

It is certified that error appears in the above-identified patent and that said Letters Patent is hereby corrected as shown below:

Title Page

Item (73) in the Assignee, change:

Enterproid HK Ltd, Tsimshatsu, Kowloon (HK)

-- to --

Enterproid, Inc., New York, New York (US)

Signed and Sealed this
Eighth Day of July, 2014

Michelle K. Lee
*Deputy Director of the United States Patent and Trademark Office*